United States Patent [19]
Medard et al.

[11] Patent Number: 5,598,340
[45] Date of Patent: Jan. 28, 1997

[54] METHOD OF PRODUCING INDUSTRIAL COMPONENTS BY THE ACTION OF LIGHT ON A POLYMERIZABLE OR CROSSLINKABLE LIQUID SUBSTANCE WITHOUT REQUIRING SUPPORTS

[75] Inventors: Claude P. Medard, Villers Les Nancy Cedex; André L. Allanic, Nancy; Philippe J. Schaeffer, Atton, all of France

[73] Assignee: Laser 3D, Villers Les Nancy Cedex, France

[21] Appl. No.: 347,460
[22] PCT Filed: Jun. 7, 1993
[86] PCT No.: PCT/FR93/00537
 § 371 Date: Feb. 1, 1995
 § 102(e) Date: Feb. 1, 1995
[87] PCT Pub. No.: WO93/25376
 PCT Pub. Date: Dec. 23, 1993

[30] Foreign Application Priority Data

Jun. 5, 1992 [FR] France .................................. 92 07021

[51] Int. Cl.⁶ ..................................................... G06F 19/00
[52] U.S. Cl. ............... 364/468.27; 264/401; 364/474.24; 395/119; 425/174.4
[58] Field of Search .............................. 364/468, 474.24, 364/474.05, 476, 473; 395/119; 264/22, 401; 425/174, 174.4

[56] References Cited

U.S. PATENT DOCUMENTS

| | | | |
|---|---|---|---|
| 4,575,330 | 3/1986 | Hull | 264/474.24 |
| 5,031,120 | 7/1991 | Pomerantz et al. | 364/468 |

FOREIGN PATENT DOCUMENTS

| | | |
|---|---|---|
| 0250121 | 12/1987 | European Pat. Off. . |
| 0416124 | 3/1991 | European Pat. Off. . |
| 0484183 | 5/1992 | European Pat. Off. . |

*Primary Examiner*—Joseph Ruggiero
*Attorney, Agent, or Firm*—Young & Thompson

[57] ABSTRACT

Method for producing a model of an industrial part by phototransformation of a curable or crosslinkable liquid organic material, comprising the addition of cured grains of material to the series of models to be fabricated, thereby eliminating completely the stage of fabricating of supports.

10 Claims, 8 Drawing Sheets

METHOD OF PRODUCING INDUSTRIAL COMPONENTS BY THE ACTION OF LIGHT ON A POLYMERIZABLE OR CROSSLINKABLE LIQUID SUBSTANCE WITHOUT REQUIRING SUPPORTS

FIELD OF THE INVENTION

The present invention relates to a method for the production of articles or models of industrial components, by the action of light and especially by the photo-transformation of a plastic or composite.

BACKGROUND OF THE INVENTION

It is desirable to be able to have recourse to an industrial component, such as, in particular, a mechanical component, before launching the full-scale manufacture thereof. Currently, in order to construct models of such components, it is necessary firstly to create dimensioned drawings, in the drawing office, based on numerical information defining the shape of the component. For some years, the method of "Computer-Aided Design" (CAD) has been used to define the shape of this component.

It is known to provide a production method and a production device with models of industrial components by direct use of the numerical data available in the output memories of the computer in order to construct the models of components without being obliged to pass via drawings, or to have to employ numerical-control machining machines, such as mills, lathes, etc.

Methods and devices proposed for the construction of models using CAD rely on laser-induced chemical polymerization. The servo-controlled movement of one or more laser beams, possibly focused at the same spot, permits local polymerization of an advantageously polyfunctional monomer and, progressively, the construction of the component.

For example, the document [1] describes a method whose general principle for constructing a component relies on the use of an apparatus comprising a tank which contains the liquid photopolymerizable monomer (or oligomer or mixture of the two) and flush with the level of this liquid is a movable platform which descends, step by step, during the operation. At the surface of the liquid, the laser beam traces successive cross-sections of the object to be produced, by virtue of a set of electronic deflection mirrors, driven by the database of the CAD system. The software has subdivided the virtual model of the article beforehand into a multitude of thin slices. Progressively as each slice solidifies, the "sculptured" model sinks slowly into the tank: with a 10-mW laser, this system permits a component 30 mm in height to be created in 50 minutes, with an accuracy of the order of one tenth of a millimeter. The model can be created from all kinds of (plastic) materials, in a great variety of colours, with different hardnesses and a wide range of abrasion resistances [3, 4].

This type of method, which requires a material being, in the initial state, in a liquid or pasty form, has a drawback when it is desired to manufacture components which include hanging parts. Once the orientation of the component has been fixed with respect to the vertical (defined by gravity during the manufacturing phase), it may occur that certain portions are not supported either by another part of the component or by the bed on which the component rests (cf. FIGS. 1A–1D).

In this case, when the light radiation comes to solidify the first part of this portion, the volume just solidified is not attached to any other solid and is isolated in the liquid. In general, the densities of the liquid and solid are different and the volume runs the risk of "flowing" if the surface tension is not sufficient to hold it at the surface. In addition, when putting the next layer of liquid in place, the component is moved, during construction, with respect to the liquid level. Since this movement is performed by means of the mechanical arm supporting it, it is impossible to impart the movement to the isolated volume, which will therefore no longer be integral with the rest of the component throughout the rest of the manufacture.

In order to solve this problem, current users of this type of method add to the component, prior to its manufacture, "supports" permitting the hanging portions to be rendered integral with the component or with the bed supporting it (cf. FIGS. 2A–2D).

Specifically, this addition is performed by modification of the database stemming from the CAD system which was used in the design of the component. It should be pointed out that this step is not a simple operation and it has many drawbacks, for the following reasons:

mastery of the CAD system which was used in the design of the component is necessary on the part of the user of a machine for manufacturing an article in 3 dimensions, which problem is aggravated by the fact that very many different CAD systems exist and that these are not completely compatible;

removal of the supports, once manufacture has been completed, is an operation which, if precautions are not taken, or if the supports are poorly placed, can damage the component;

it is quite difficult to automate this step, since the placing of the supports, so as to make it easier to remove them (while at the same time ensuring correct manufacture of all the hanging portions), requires a great deal of experience, difficult to formalize;

finally, certain components may have hanging portions which are very difficult to access, making them virtually impossible to manufacture by this type of method (cf. FIG. 3).

Other rapid prototyping methods, such as, for example, the one described in the document [2], solve this problem by using a solid material, which ensures that no isolated portion can "flow" or move during the manufacture. However, these methods have other drawbacks compared to the methods using liquid, in particular as regards the loss of useful material during manufacture.

SUMMARY OF THE INVENTION

The object of the present invention is to modify the liquid-based method so that it has the same advantages as the methods based on a solid material, without having the drawbacks thereof.

The basic idea is that, during manufacture, the component is no longer in a liquid medium but, on the contrary, in a medium which prevents the isolated elements from flowing and renders them integral with the rest of the component, while at the same time not raising any more problems during the final extraction of the component, than if the component were still in liquid.

In order to do this, an artificial medium is manufactured which possesses these properties and lies at the interface between the liquid and the component.

A first solution consists in manufacturing a sufficiently solid gel around the component so that the isolated portions do not budge, but so that it is possible all the same to extract the component after completing its manufacture.

This is a solution very difficult to put into practice, since it would require adjustments making it possible to obtain a gel which is homogeneous over quite large volumes (at least of the order of one mm$^3$), which is impracticable when the irradiation takes place exclusively from one side of the volume only, that is to say the case in the method about which we are speaking.

This is why the present invention recommends rather a medium that could be described as a "wet powder", that is to say a large number of small solid elements bound by a liquid, which may be by far the minority phase, in terms of volume, compared to the material in solid form.

It is quite possible to manufacture this medium from the liquid: wet powder can, after all, be considered as a component like anything else. The manufacture of the component may therefore be performed simultaneously with the manufacture of the wet powder surrounding it, this completely avoiding recourse to any support and not impeding extraction of the component on completing manufacture (cleaning off this kind of powder is much simpler than breaking the supports).

Let us summarize the advantages of the use of wet powder:

- the addition of wet powder to a component is extremely simple to automate: all that is necessary is that the component be entirely encompassed (to a sufficient thickness);
- it is completely pointless to add supports, this resulting in a spectacular decrease in the "computing cost" of the manufacture of a component (some users of the method consider that the manufacturing time for a slightly complex component is 80% composed of computing work);
- the final cleaning runs less of a risk of damaging the component than when it is necessary to detach the supports therefrom;
- some components, impossible to manufacture by that method (for example when it is impossible to add supports since they could not be removed from the component on completing its manufacture) become feasible, still without imposing a computing cost.

On the other hand, the fact of manufacturing powder at the same time as the component amounts to solidifying a greater volume than is strictly necessary. In addition, a few problems of implementation have to be solved:

- the portions located at the periphery of the powdery medium may be considered as isolated from the rest of the component and they run the risk of not being integral with it during a movement;
- it is necessary that the liquid should not remain contaminated by particles of powder once the manufacture of the component is completed.

In order to solve these problems, one possible solution consists in simultaneously manufacturing the component, a leaktight enclosure around the component, and some wet powder located between the enclosure and the component (cf. FIGS. 4A and 4B). The purpose of the enclosure is to confine the powder and to ensure its integrity when putting the layers into place.

Nevertheless, although the presence of an enclosure makes it possible to prevent migration of the powder towards the tank, it does not ensure that, within the enclosure, the powder is completely immobilized. Now, even a small movement of the powder inside the enclosure can lead to the accidental sticking of powder particles to the walls of the component during the solidification of these walls (cf. FIGS. 5A and 5B).

This is why it is necessary to design the shape of the solid elements of the powder so that they have good cohesion, it still being possible simply to wash them off when cleaning the component. In order to do this, all kinds of "interlocking particles" may be conceived, and FIGS. 6A–6C show a few examples thereof.

Of course, it is possible to mix various kinds of particles in the powder, using the particles most appropriate to the geometrical characteristics of the various regions of the component.

In order to reduce the amount of resin polymerized in the form of powder, it is possible to include, at judicious points in the powdery medium, "bubbles" (which are not necessarily spherical) of resin surrounded by an enclosure (cf. FIG. 7). It will be possible to reuse the resin contained in these bubbles for the next manufacture.

It is necessary to choose judicially the points where these bubbles are placed, since it may happen that a bubble is too large to be removed from the component on completing manufacture (cf. FIG. 8). This problem can be circumvented either by not putting bubbles at points in the component which are difficult to access, or by putting bubbles there which have a sufficiently small size not to be a problem during the cleaning step.

Still with a mind to simplifying the final cleaning step, it may be advantageous to facilitate this task by adopting, for the bubbles and the enclosure, a manufacture using contiguous shells which are not bonded to each other (cf. FIGS. 9A and 9B). Thus the extraction of the component from the enclosure and the recovery of the resin which is in the bubbles will be considerably facilitated.

In order to ensure sufficient strength of these shells when handling the component prior to cleaning it (taking out of the tank and transporting to the cleaning area), the shells, and in particular those of which the enclosure is composed, may be attached to each other by "bridges" of material (cf. FIG. 10), or indeed hinges (cf. FIG. 11). The shells are then separated by breaking or opening these attachment systems.

BRIEF DESCRIPTION OF THE DRAWINGS

The description which will follow, with regard to the appended drawings, will explain in more detail how the invention can be realized.

DETAILED DESCRIPTION OF THE INVENTION

FIGS. 1A–1D show three intermediate steps in the manufacture of the component "P". It can be seen that P includes hanging regions "S", that is to say ones connected neither to the plate for supporting P nor to another part of P. During step A, the lowest portion "i" (for "isolated") of the region S has solidified, but it is not connected to the solid. After P descends into the liquid (that is to say at step B), the portion "i" of step A may be considered as completely detached from the component (it now appears as the portion "d", for "detached"). On reaching step C, the isolated portions "i" of steps A and B are detached and have become portions "d".

FIGS. 2A–2D show the normal procedure for solving the problems described in FIGS. 1A–1D. This essentially consists in adding supports "1" to "P" so as not to end up creating "i" or "d"-type portions, as illustrated by steps A to C corresponding precisely to steps A to C in FIGS. 1A–1D.

Figure 1D:
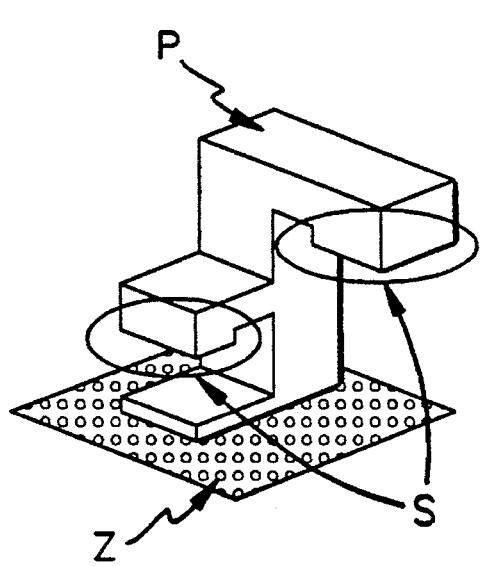
FIGS. 1A–1D show three intermediate steps in the manufacture of the component "P".
Figure 1A:
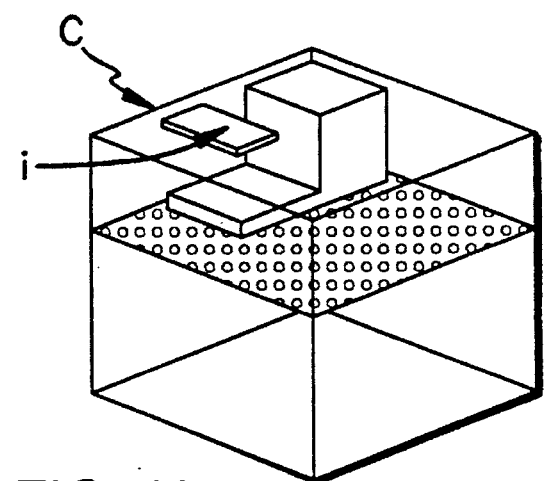
Figure 1B:
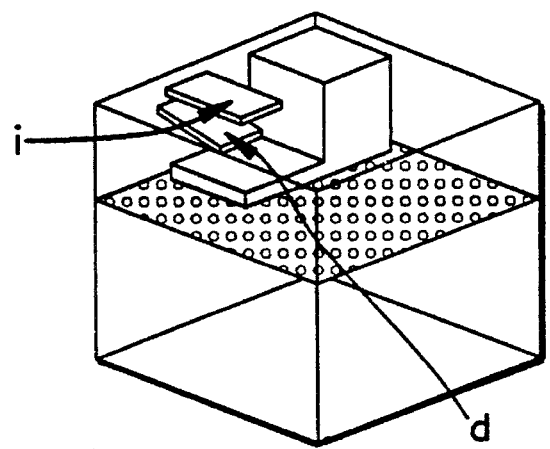
Figure 1C:
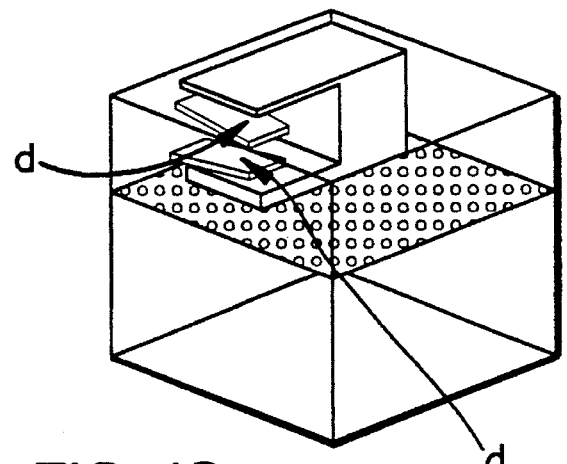
Figure 2D:
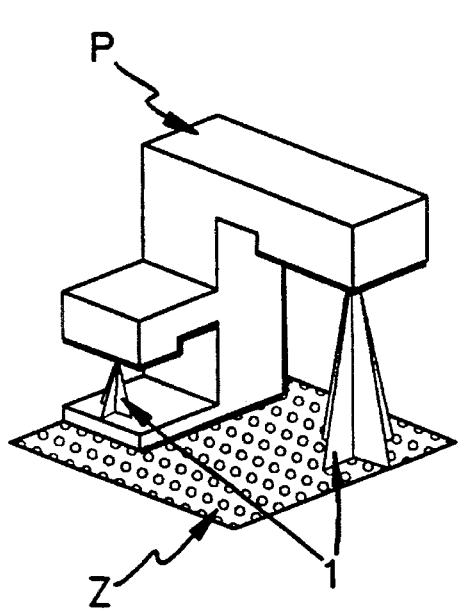
FIGS. 2A–2D show the normal procedure for solving the problems described in FIG. 1.
Figure 2A:
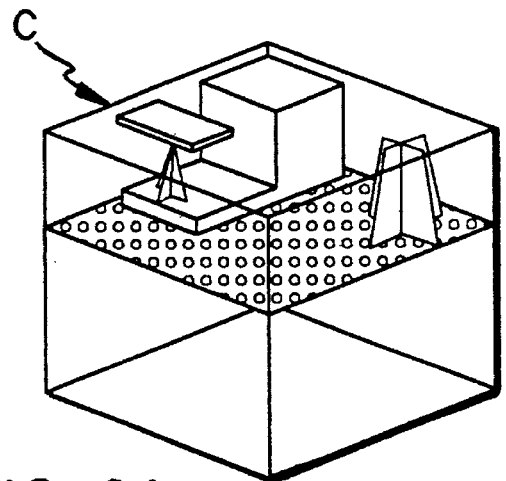
Figure 2B:
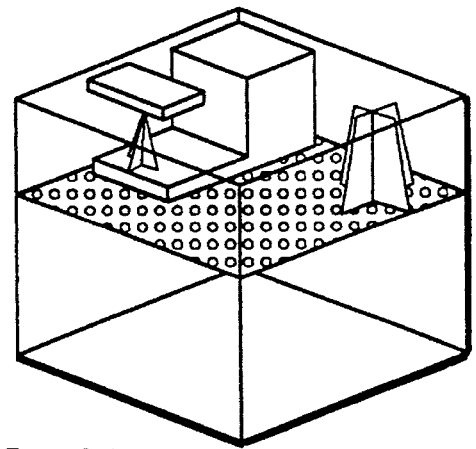
Figure 2C:
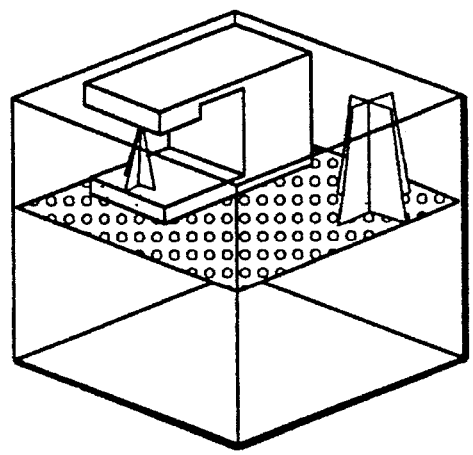
Figure 3:
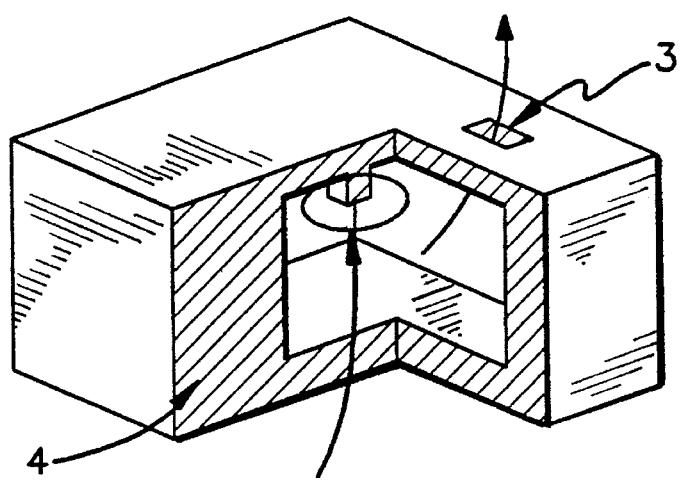
FIG. 3 shows an example of a component for which it is difficult to implement the technique shown in FIGS. 2A–2D.

FIG. 3 shows an example of a component ("4") for which it is difficult to employ the technique shown in FIG. 2. In fact, it is very difficult to remove, after manufacture, (via the orifice "3"), any support whose function is to permit manufacture of the region "2": this support would be entirely inside "4" and it would therefore be forced to pass via "3". Comment: for reasons of legibility, the articles appearing in FIGS. 4A and 4B, 7 and 8 have had one quarter removed.

The solution adopted for the method forming the subject of this patent is described in FIG. 4. Associated with the component "P" are a set of particles "G" and an enclosure "E", so that their simultaneous manufacture ends up with a group of components avoiding recourse to supports, irrespective of the shape of "P". The enclosure "E" is desired to encompass "P" completely, and the particles "G" are placed between "E" and "P" so that the hanging parts of "P" can be manufactured without adding supports.

Figure 5A:
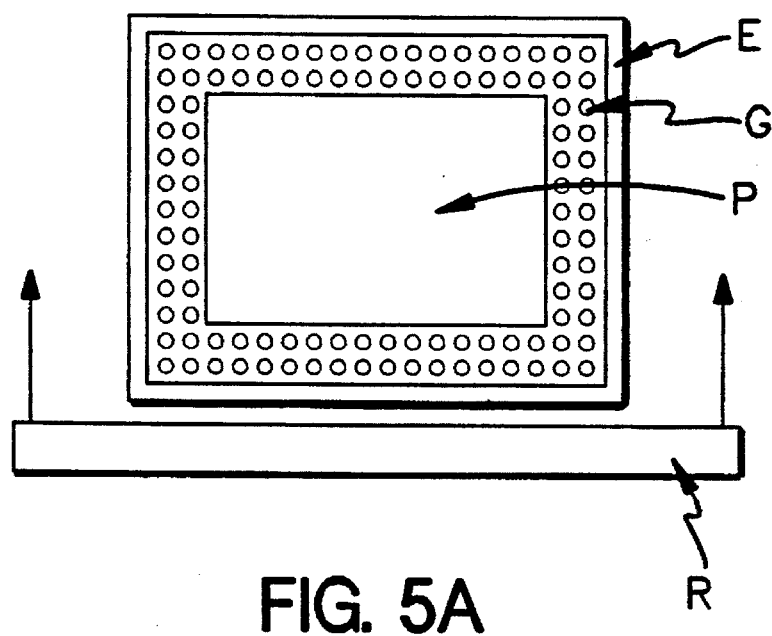
FIGS. 5A and 5B illustrate a problem which may occur when employing the method described in FIGS. 4A and 4B.
Figure 5B:
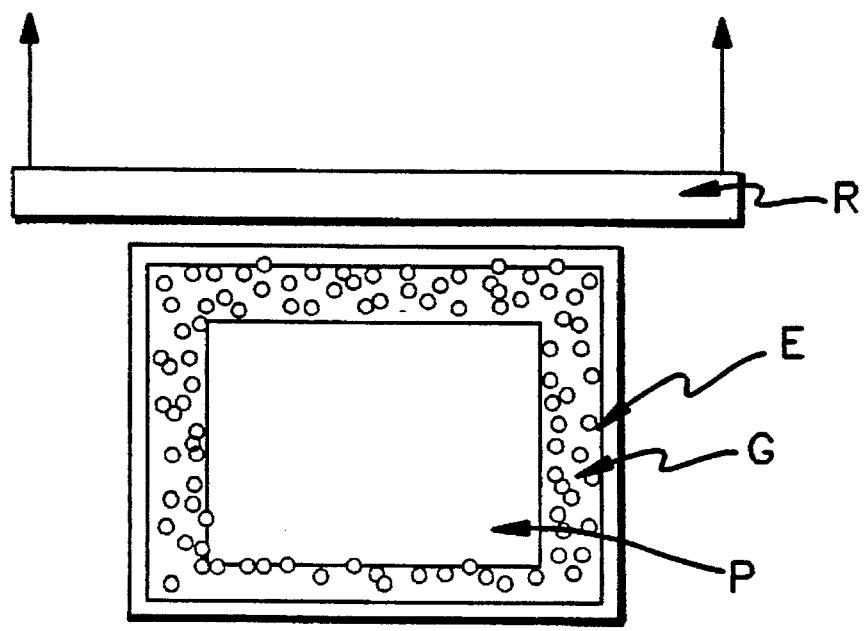

FIGS. 5A and 5B illustrate a problem which may occur when employing the method described in FIG. 4. Step A shows the view from above of the surface of the liquid during construction of a component (only the solidified parts "P", "E" and "G" are depicted), just after a polymerization step. The device "R", whose purpose is to establish the next layer of liquid, is just about to pass over the solidified parts. If the particles "G" are not compacted enough, they will be dispersed by the passing of "R", as shown in step B. During the next polymerization step, the particles moved to a position too close to "P" run the risk of ending up associated with "P".

Figure 6A:
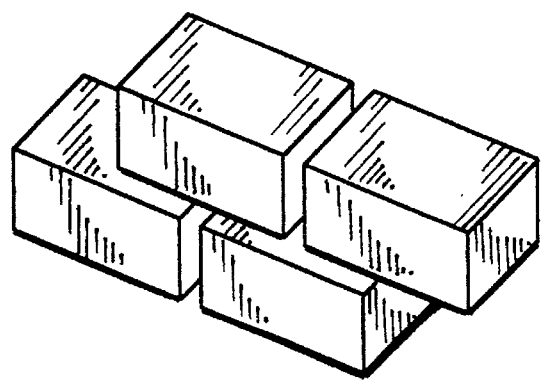
FIGS. 6A–6C show a few examples of shapes of particles making it possible to solve the problems described in FIGS. 5A and 5B.
Figure 6B:
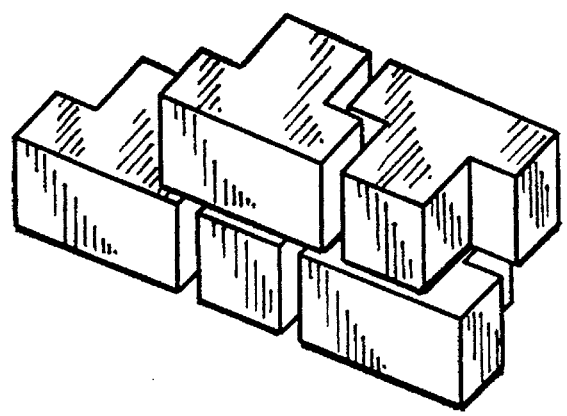
Figure 6C:
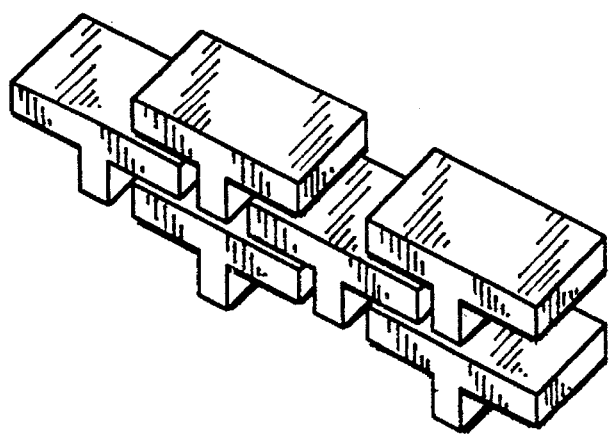

FIGS. 6A–6C show a few examples of shapes of particles "G" making it possible to solve the problems described in FIGS. 5A and 5B.

The particles of type A form a 3-dimensional block comparable to a brick wall with no mortar. Depending on the relative size of the particles compared to the component, the cohesion of the assembly may be sufficient not to end up in a situation such as described in FIGS. 5A and 5B. The "demolition" of this structure during cleaning causes no problem.

If greater cohesion is necessary, the particles of type B to D may be used: they offer good resistance to the passing of a mechanical system for putting the layers into place, if this system moves in the direction V. They do, however, permit easy cleaning.

Figure 7:
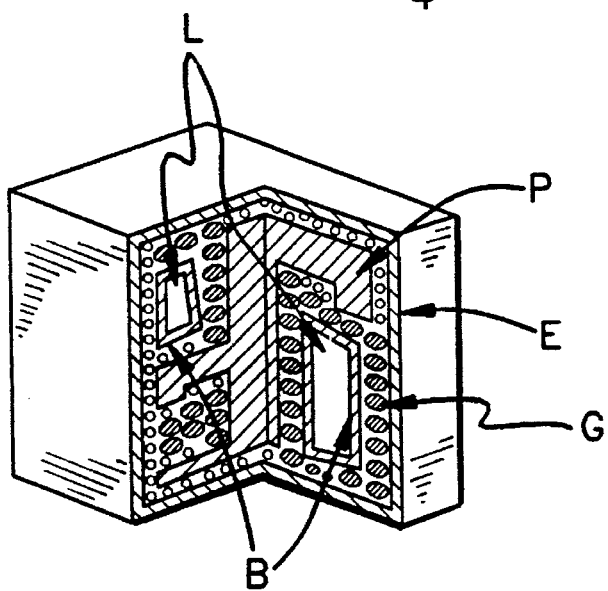
FIG. 7 shows how the use of bubbles makes it possible to preserve entirely liquid portions.

FIG. 7 shows how the use of bubbles "B" makes it possible to preserve entirely liquid portions "L", thereby limiting the number of particles "G" to be made compared to the number necessary in the absence of the bubbles "B" (cf. FIG. 4). The amount of material solidified (and therefore not reusable) may considerably decrease in this way.

Figure 8:
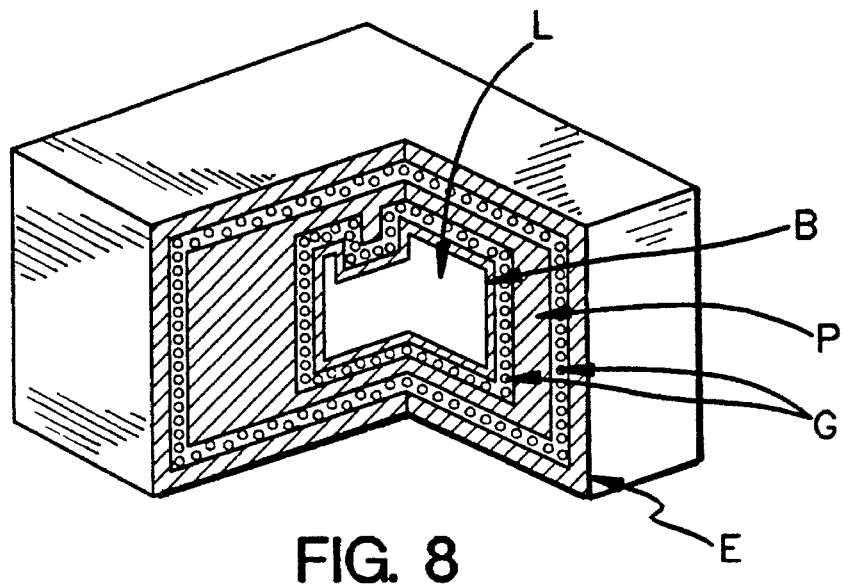
FIG. 8 demonstrates the fact that using particles can solve the problem described in FIG. 3.
Figure 4A:
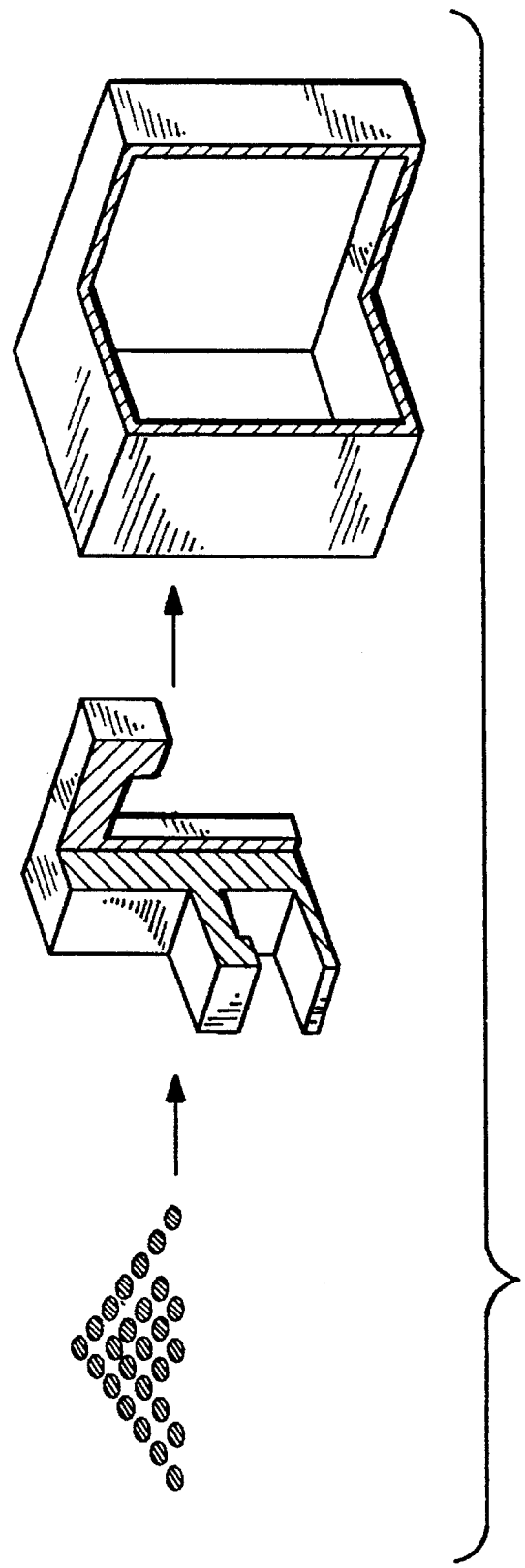
FIGS. 4A and 4B are respectively exploded perspective and assembled perspective views showing the solution adopted for the method forming the subject of this patent.
Figure 4B:
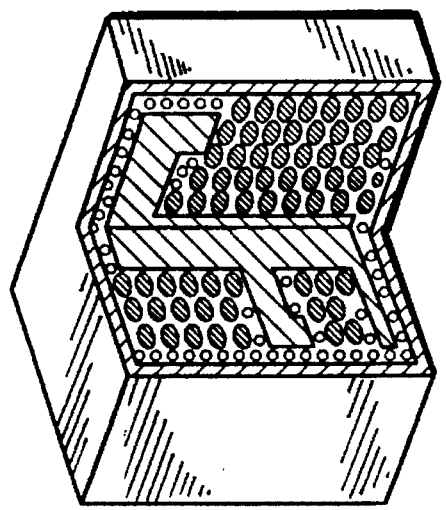

FIG. 8 demonstrates the fact that using particles "G" may solve the problem described in FIG. 3. All the solid parts lying inside "P" on completing manufacture (which particles may be of very small size) may be removed via the orifice "3" which would not have been the case if a support had been necessary.

Figure 9A:
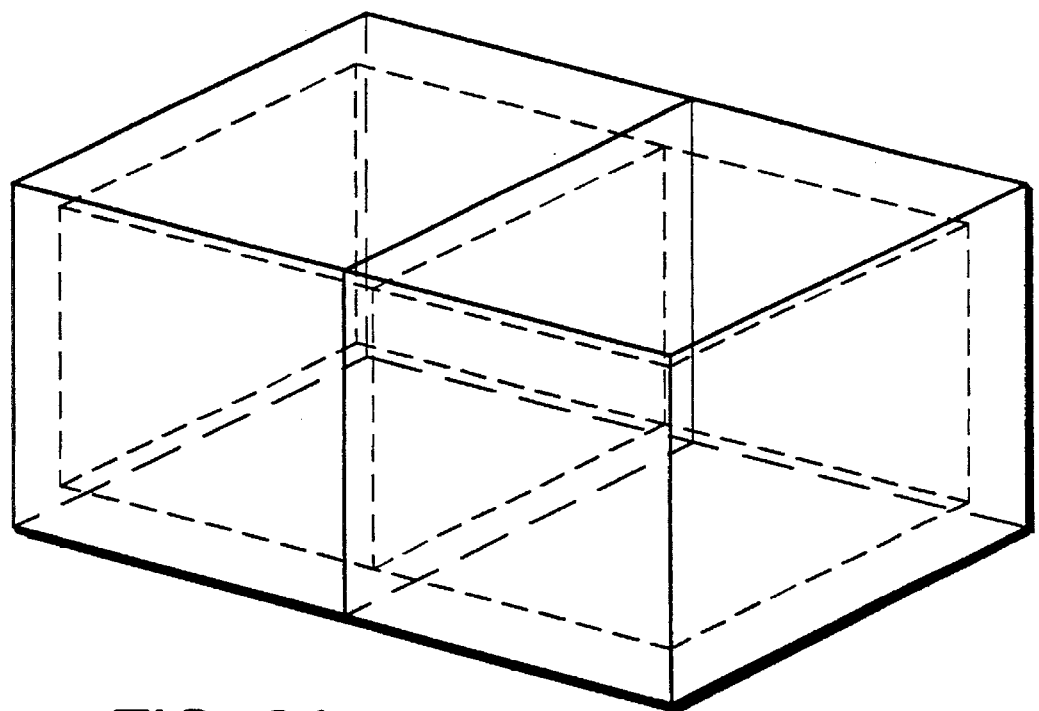
FIGS. 9A and 9B show two examples of the break-down of an enclosure.
Figure 9B:
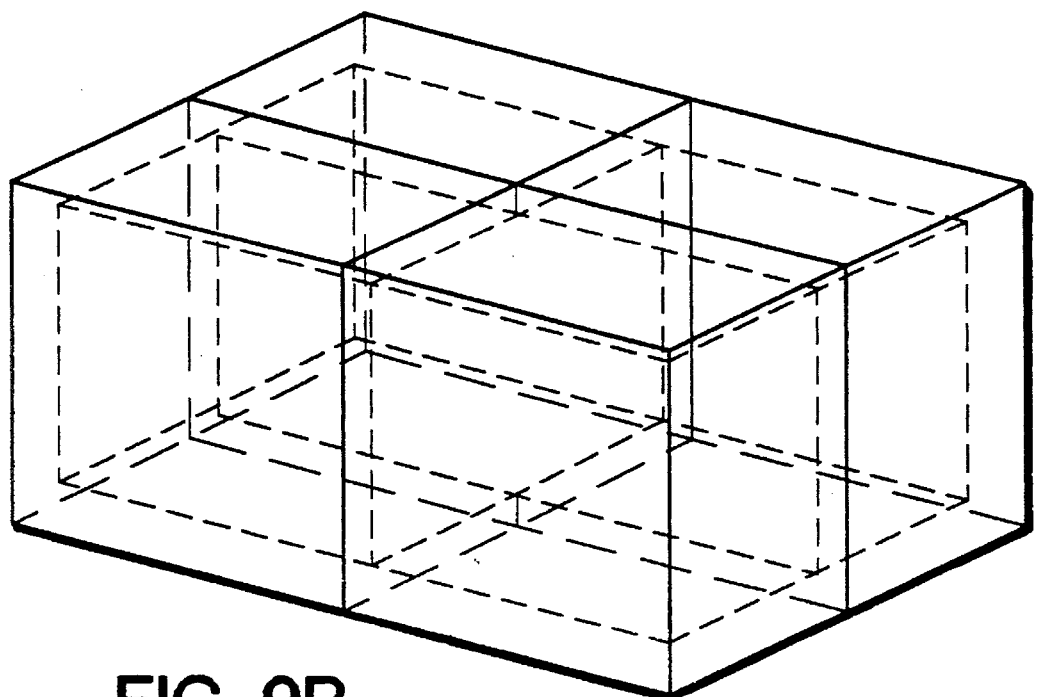

FIGS. 9A and 9B show two examples of the break-down of an enclosure, in order to facilitate its "demolition" when cleaning the component. Example A cuts the enclosure into two shells, and example cuts it into 4.

Figure 10:
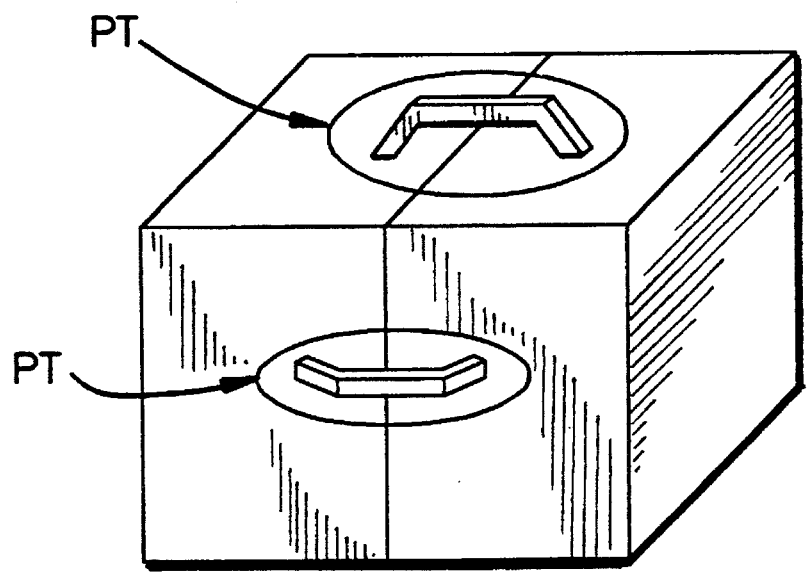
FIG. 10 shows one possible example of attachments for maintaining the cohesion of the multiple shells of an enclosure.
Figure 11:
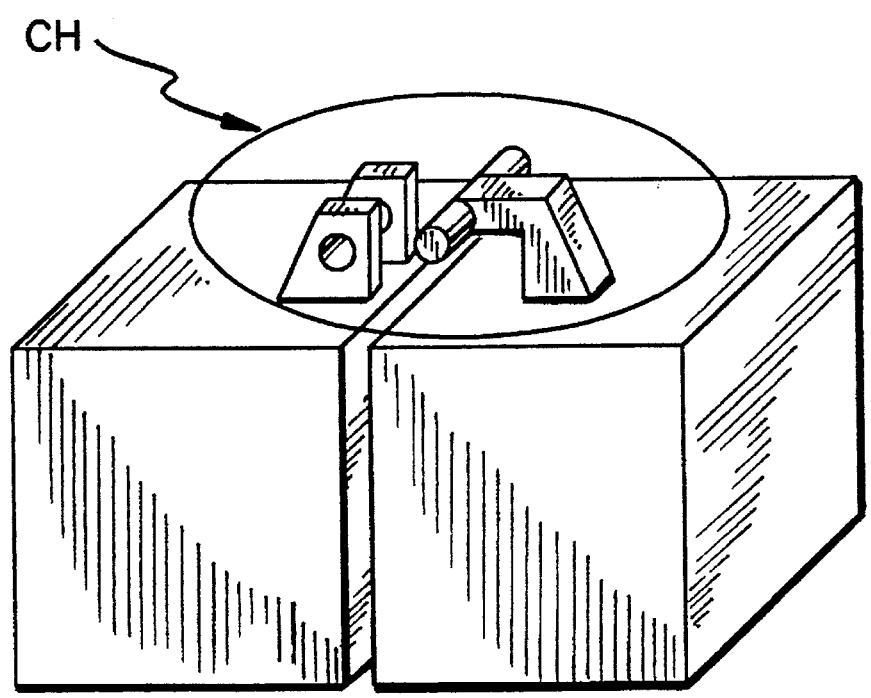
FIG. 11 shows one possible example of "hinge"-type attachments for maintaining the cohesion of the multiple shells of an enclosure.

FIGS. 10 and 11 show examples of possible attachment for maintaining the cohesion of the multiple shells forming the enclosures up until the final step of cleaning (that is to say during the manufacturing step when the component is taken out of the tank, and when it is moved to the cleaning area). The "bridges of solid material" PT in FIG. 10 are sufficiently thin (depending on the resin) to be able to be easily broken by hand. In FIG. 11 is depicted an example of a "hinge" CH making it possible to keep the shells together.

References

[1] J. C. André, A. Le Mehauté and O. De Witte, French Patent "Dispositif pour réaliser unmodèle de pièce industrielle" ["Device for constructing a model of an industrial component"], filed on 16/07/84, No. 84/11241.

[2] J. C. Andrée, M. Cabrera, J. Y. Jezequel and P. Karrer, French Patent "Procédé et dispositif de production de modèles de pièces industrielles par action de la lumière" ["Method and device for producing models of industrial components by the action of light"], filed on 19/05/88, No. 88/06708.

[3] SCIENCE ET TECHNOLOGIE [SCIENCE AND TECHNOLOGY] No. 2, February, 1988].

[4] INDUSTRIAL LASER REVIEW, Vol. 2, No. 8, January, 1988, pages 11–37.

[5] 2nd International Conference on Rapid Prototyping, pp 29–38, Dayton, Jun. 23–26, 1991.

We claim:

1. Method of manufacturing a set E of three-dimensional solid components by phototransformation of a polymerizable or crosslinkable organic material, by absorption of light by polymerization or cross-linking photoinitiators, which comprises:

a) providing at least one source of light radiation;

b) providing automated members for establishing and for superposing, automatically, thin layers of the material;

c) confining the light emitted by the source of light radiation in the form of at least one point of impact on the material;

d) automatically moving said at least one point of impact on the material;

e) storing the geometrical shape of the set E;

f) computing a set of elementary volumes such that, once they are phototransformed, said elementary volumes altogether constitute a set F of components such that E is included in F;

g) controlling and driving all the automated members necessary for the manufacture; and h) including in the set F of components constructed for the manufacture of the set E, a set G of solid particles, which form during the manufacturing step, a powder of phototransformed material mixed with material still in liquid form, said particles not necessarily having the same geometrical shape.

2. Method according to claim 1, wherein the set F further includes a set C containing at least one enclosure.

3. Method according to claim 2, wherein at least one of the elements of C completely encompasses at least one element of E.

4. Method according to claim 2, wherein the volume encompassed by at least one of the elements of C is entirely in liquid form on completing manufacture.

5. Method according to claim 3, wherein each element of the set G of solid particles lies inside an element of C.

6. Method according to claim 5, wherein at least one element of C encompasses a volume occupied by elements of C and/or of E, and/or by a medium V comprised of elements of G.

7. Method according to claim 1, wherein the elements of the set G are mutually imbricated.

8. Method according to claim 2, wherein at least one element of C is composed of several contiguous parts connected together via an attachment system, which can be easily broken or opened.

9. Method according to claim 8, wherein the attachment system is a hinge.

10. Method according to claim 8, wherein the attachment system is a bridge of material, sufficiently thin to be able to be broken by hand without any effort.

* * * * *

UNITED STATES PATENT AND TRADEMARK OFFICE
CERTIFICATE OF CORRECTION

PATENT NO. : 5,598,340
DATED      : January 28, 1997
INVENTOR(S): Claude MEDARD et al.

It is certified that error appears in the above-indentified patent and that said Letters Patent is hereby corrected as shown below:

On the title page:

In Item [22] PCT Filed: change "Jun. 7, 1993" to --Jun. 4, 1993--.

Signed and Sealed this

Twenty-second Day of April, 1997

Attest:

BRUCE LEHMAN

*Commissioner of Patents and Trademarks*

*Attesting Officer*